United States Patent [19]

Marcus et al.

[11] 4,126,560
[45] Nov. 21, 1978

[54] FILTER MEDIUM

[75] Inventors: James T. Marcus, Belvidere; Harry M. Kennard, Chester, both of N.J.

[73] Assignee: Brunswick Corporation, Skokie, Ill.

[21] Appl. No.: 808,544

[22] Filed: Jun. 21, 1977

Related U.S. Application Data

[63] Continuation of Ser. No. 679,486, Apr. 23, 1976, abandoned.

[51] Int. Cl.$^2$ .............................................. B01D 25/04
[52] U.S. Cl. ........................................ 210/489; 55/487; 55/523; 55/525; 210/492; 210/496; 210/499; 210/510
[58] Field of Search ................. 210/65, 484, 488, 492, 210/496, 495, 505, 506, 510, 509, 491, 490, 499; 55/486, 487, 523, 525; 264/176 F; 425/198

[56] References Cited

U.S. PATENT DOCUMENTS

| 2,883,261 | 4/1959 | McGeorge | 425/198 |
| 3,003,643 | 10/1961 | Thomas | 210/506 |
| 3,505,038 | 4/1970 | Luksch et al. | 19/156.4 |

FOREIGN PATENT DOCUMENTS 4,313,335  12/1965  Japan ....................................... 425/198

*Primary Examiner*—Frank Sever
*Attorney, Agent, or Firm*—John G. Heimovics

[57] ABSTRACT

Disclosed is a filter medium for removing contaminants, including gels, from molten polymers. The medium contains layers of sintered metal fibers having diameters of 50 microns or less. At least two adjacent layers are separated by a screen, and the screen and layers are bonded together by compression and sintering. Preferably the layers include from 35 to 60 volume percent fibers. The filter medium is graded so that the polymer as it flows through the medium encounters fiber layers having pores that generally decrease in size. The screen has pores that are larger than the average size of the pores in any downstream layer and that are larger than the average size of the pores in the upstream layer immediately adjacent the screen. The screen collects at least some of the gels or other particles that pass through the upstream layer, giving the medium a higher dirt holding capacity than the conventional filter medium.

2 Claims, 1 Drawing Figure

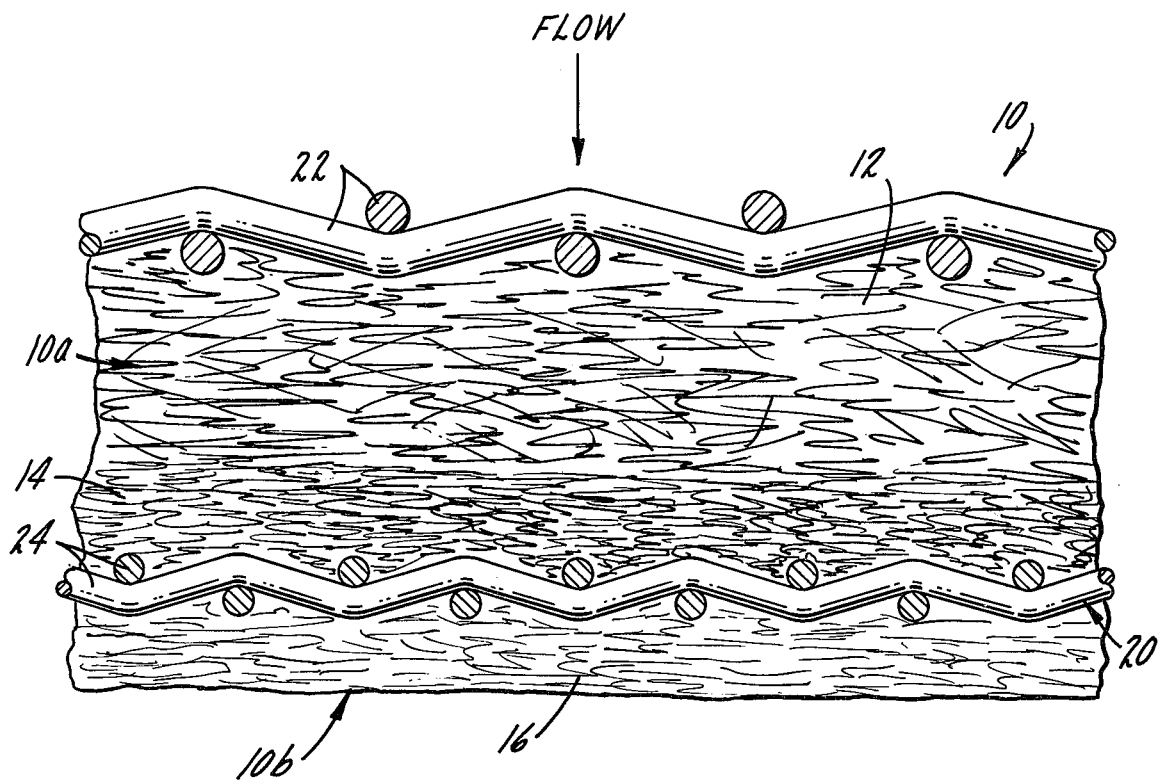

FILTER MEDIUM

CROSS REFERENCE OF CO-PENDING APPLICATION

This application is a continuation application of co-pending application Ser. No. 679,486, filed Apr. 23, 1976, now abandoned.

BACKGROUND

Synthetic fibers are made from polymers by melting the polymer and drawing it through a spinneret which contains tiny openings. The polymer usually contains gels, unusually high molecular weight polymer material, and solid particles of contamination. The gels and particles must be removed prior to spinning. If either the gels or solid particles are not removed, they can clog the openings of the spinneret or cause weak points in the fiber, resulting in fiber breakage.

Contaminants, including gels, are removed by passing the polymer through a filter medium which includes sintered metal fibers. Preferably, several layers of fibers having different diameters are employed. This provides layers of differing porosity. These layers are stacked upon each other to provide a structure where the pores decrease in size along the flow path of the polymer.

One problem with this conventional filter medium is that it trends to be clogged with gels or solid particles. The gels tend to extrude through larger, upstream pores. As they encounter smaller pores, the gels are broken apart into small fragments which eventually clog the tiny downstream pores of the filter medium. Normally, the on-stream life of the conventional filter medium ranges between 300 and 4,000 pounds of polymer flow per cubic inch of medium, depending upon the type of polymer being filtered and filtration conditions. This on-stream life could be extended if the filter medium had a greater contaminant holding capacity.

THE INVENTION

We have invented a filter medium having greater contaminant holding capacity than the conventional filter medium used to filter polymers. The on-stream life of our filter medium is approximately twice that of the conventional filter medium for the same filtration conditions.

The filter medium of our invention comprises layers of sintered metal fibers and a member which separates at least two adjacent layers. The member has pores that are larger than the average size of the pores in the upstream layer immediately adjacent the member and that are larger than the average size of the pores in any downstream layer. This member collects and holds at least some of the contaminants that exit the upstream layer, giving our medium additional contaminant holding capacity.

The preferred form of the member is a woven screen. Screens having meshes between 100 and 400 using wires having diameters ranging between 20 and 50 microns are preferred. We have found it most advantageous to place the screen in a graded filter medium between an upstream layer where the average size of its pores are between 10 and 150 microns and a downstream layer where the average size of its pores are between 5 and 40 microns. Typically the pore size of the screen ranges between 40 and 150 microns.

The individual layers of metal fibers are formed from the air laid webs described in U.S. Pat. No. RE. 28,470. Webs of metal fibers of different diameters and different densities are stacked together. In some applications it may be desirable to separate all the layers with screens. The assembly of screens and layers of metal fibers is compressed and sintered to bond the fibers to each other and the screens. Normally the layers will contain 35 to 60 percent fiber by volume. Typically the diameters of the fibers will be less than 50 microns, preferably from 4 to 25 microns.

THE DRAWING

The FIGURE is an enlarged cross-sectional view of the filter medium of our invention.

DETAILED DESCRIPTION OF THE DRAWING

The FIGURE shows one embodiment of our novel filter medium 10. This medium 10 includes three layers 12, 14, and 16. Layer 12 contains 15 volume percent of 25 micron metal fibers and has an average pore size of 80 microns. Layer 14 contains 60 volume percent of 12 micron fibers and has an average pore size of 30 microns. Layer 16 contains 15 volume percent of 8 micron fibers and has an average pore size of 10 microns. All the fibers are made of stainless steel.

A mesh screen 20 of woven 0.0014 inch diameter stainless steel wires 24 divides the medium 10 into an upstream section 10a, which includes the layers 12 and 14 and a protective outer screen 22, and a downstream section 10b, which includes the layer 16. The screen 20 has pores of a uniform size of 40 microns. The layers 12, 14, and 16 and the screens 20 and 22 are compressed and sintered for 1½ hours at 1950° F. to bond the screens and layers together in a unified, strong assembly which will not burst when subjected to the high pressures normally encountered during filtration of polymers.

Although we do not entirely understand why our medium 10 has a longer on-stream life than conventional filter medium, we believe the internal screen 20 acts like a holding chamber. As the polymer flows through the medium 10, gels will be compressed as they extrude through the pores of the layers 12 and 14. When the gels reach the screen 20, we believe they expand and fill the openings in the screen or attach themselves to the wires 24. Apparently, at least some of the gels in the polymer are trapped by the screen 20 before they are fragmented to small particles which will clog the pores of the downstream layer 16. Very large particles and gels are trapped by layer 12 and screen 22. Some small particles and gels will pass through layer 14, but be trapped by screen 20. These particles are apparently exposed to a smaller driving force and tend to remain attached to the screen 20. Very small particles, however, will penetrate into and be trapped in layer 16.

We claim:

1. A one piece monolithic filter media for removing particle contaminants and gels from a molten fluid polymer stream passing through the media, consisting of at least:
   three layers of materials, each layer
   sinter bonded to the adjacent layer,
   (a) the first layer comprising a sintered web of metal fibers wherein the metal fibers are bonded to each other, the fibers each having a diameter ranging from about 4 microns to about 25 microns, the density of the layer ranging from about 35% to 60% and the pore sizes in the layer ranging from about 10 microns to about 150 microns;

(b) the second layer comprising a metallic wire screen having pore sizes ranging from about 40 microns to about 150 microns and adjacent the first layer;
(c) the third layer comprising a sintered web of metal fibers wherein the metal fibers are sinter bonded to each other, the fibers each having a diameter ranging from about 4 microns to about 25 microns, the density of the layer ranging from about 35% to about 60% and the average pore sizes in the layer ranging from about 5 microns to about 40 microns and adjacent the second layer;
(d) the fluid passing first through the first layer and last through the third layer;
(e) the size of the pores of the second layer preselected to be larger than the pore sizes of the first and third layers trapping a high percentage of the contaminants and gels therein thereby substantially increasing the contaminant and gel holding capacity of the filter media, the thickness of the media is a small fraction of the surface area.

2. A one piece monolithic filter media for removing particle contaminants and gels from a molten liquid polymer passing therethrough, consisting of at least:
four layers of materials, each layer sinter bonded to each adjacent layer,
(a) the first layer comprising a sintered web of metal fibers, the fibers each having a diameter of approximately 25 microns, and the web having a density of about 15% and an average pore size of about 80 microns;
(b) the second layer comprising a sintered web of metal fibers, the fibers each having a diameter of approximately 12 microns, and the web having a density of about 60% and an average pore size of about 30 microns;
(c) the third layer comprising a metallic wire screen and having a pore size of about 40 microns, the wires having a diameter of about 0.0014 inches thereby forming a cavity of about 90,000 cubic microns for capturing gels and particles;
(d) the fourth layer comprising a sintered web of metal fibers, the fibers each having a diameter of approximately 8 microns, and the web having a density of about 15% and an average pore size of about 10 microns; the size of the pores in the third layer being larger than the average pore sizes of the adjacent second and fourth layers, the thickness of the media is a small fraction of the surface area.

* * * * *